United States Patent
Lin et al.

(10) Patent No.: US 10,979,975 B2
(45) Date of Patent: Apr. 13, 2021

(54) METHOD AND APPARATUS FOR MAINTAINING RADIO RESOURCE CONTROL CONNECTION IN MOBILE COMMUNICATIONS

(71) Applicant: MediaTek Inc., Hsinchu (TW)

(72) Inventors: Jia-Shi Lin, Hsinchu (TW); Chin-Wei Hsu, Hsinchu (TW); Yu-Ting Yao, Hsinchu (TW); Shih-Chieh Liao, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/228,645

(22) Filed: Dec. 20, 2018

(65) Prior Publication Data

US 2019/0200292 A1    Jun. 27, 2019

Related U.S. Application Data

(60) Provisional application No. 62/608,664, filed on Dec. 21, 2017.

(51) Int. Cl.
| | |
|---|---|
| *H04W 52/02* | (2009.01) |
| *H04W 76/19* | (2018.01) |
| *H04W 72/08* | (2009.01) |
| *H04W 72/04* | (2009.01) |
| *H04W 76/22* | (2018.01) |
| *H04W 76/25* | (2018.01) |

(52) U.S. Cl.
CPC ..... *H04W 52/0216* (2013.01); *H04W 72/048* (2013.01); *H04W 72/085* (2013.01); *H04W 76/19* (2018.02); *H04W 76/22* (2018.02); *H04W 76/25* (2018.02)

(58) Field of Classification Search
CPC . H04W 52/0216; H04W 76/25; H04W 76/19; H04W 76/22; H04W 72/048; H04W 72/085
See application file for complete search history.

(56) References Cited

U.S. PATENT DOCUMENTS

| | | | |
|---|---|---|---|
| 2001/0031634 A1* | 10/2001 | Mizutani | H04Q 7/20 |
| 2007/0201397 A1* | 8/2007 | Zhang | H04Q 7/00 |
| 2013/0021929 A1* | 1/2013 | Kim | H04W 36/08 |
| 2018/0027512 A1* | 1/2018 | Bergquist | H04W 56/00 |
| 2019/0182789 A1* | 6/2019 | Kim | H04W 60/04 |
| 2019/0191295 A1* | 6/2019 | Jain | H04W 8/14 |

* cited by examiner

*Primary Examiner* — Ronald B Abelson
(74) *Attorney, Agent, or Firm* — Han IP PLLC; Andy M. Han

(57) ABSTRACT

Various solutions for maintaining a radio resource control (RRC) connection with respect to user equipment and network apparatus in mobile communications are described. An apparatus may establish an RRC connection with a network node. The apparatus may transmit a layer 2 packet to maintain the RRC connection after a period of time without data transmission. The apparatus may transmit uplink data via the RRC connection without re-establishing the RRC connection.

5 Claims, 4 Drawing Sheets

METHOD AND APPARATUS FOR MAINTAINING RADIO RESOURCE CONTROL CONNECTION IN MOBILE COMMUNICATIONS

CROSS REFERENCE TO RELATED PATENT APPLICATION(S)

The present disclosure is part of a non-provisional application claiming the priority benefit of U.S. Patent Application No. 62/608,664, filed on 21 Dec. 2017, the content of which is incorporated by reference in its entirety.

TECHNICAL FIELD

The present disclosure is generally related to mobile communications and, more particularly, to maintaining radio resource control (RRC) connection with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE), a user equipment (UE) may establish an RRC connection with a network apparatus. The UE may be able to transmit uplink (UL) data or receive downlink (DL) data via the RRC connection in a RRC connected mode. When there is no data transmission, the UE may enter into an RRC idle mode for power saving. Alternatively, after a period of time without data transmission, the network apparatus will release the RRC connection to save radio resources and UE's power.

When the UE is in the RRC idle mode or the RRC connection is released, the UE is not able to perform UL/DL data transmissions. The UE may need to establish/re-establish the RRC connection for further UL/DL data transmissions. However, the establishment/re-establishment procedure may cause extra latency. For some scenarios or applications, such extra latency may seriously affect the performance of the UE or the user experiences.

Accordingly, how to reduce end-to-end latency for certain scenarios or applications may become a new issue in developing a communication system. It is needed to provide proper mechanisms to maintain the RRC connection between the UE and the network apparatus for avoiding additional latency due to connection re-establishment procedures.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to maintaining RRC connection with respect to user equipment and network apparatus in mobile communications.

In one aspect, a method may involve an apparatus establishing an RRC connection with a network node. The method may also involve the apparatus transmitting a layer 2 packet to maintain the RRC connection after a period of time without data transmission. The method may further involve the apparatus transmitting, uplink data via the RRC connection without re-establishing the RRC connection.

In one aspect, an apparatus may comprise a transceiver capable of wirelessly communicating with a network node of a wireless network. The apparatus may also comprise a processor communicatively coupled to the transceiver. The processor may be capable of establishing an RRC connection with the network node. The processor may also be capable of transmitting a layer 2 packet to maintain the RRC connection after a period of time without data transmission. The processor may further be capable of transmitting uplink data via the RRC connection without re-establishing the RRC connection.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to maintaining RRC connection with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE, the UE may establish a RRC or an evolved RRC (eRRC) connection with the network apparatus. The UE may be able to transmit UL data or receive DL data via the RRC/eRRC connection in an RRC/eRRC connected mode. When there is no data transmission, the UE may enter into an RRC/eRRC idle mode for power saving. Alternatively, after a period of time without data transmission, the network apparatus will release the RRC/eRRC connection to save radio resources and UE's power. When the UE is in the RRC/eRRC idle mode or the RRC/eRRC connection is released, the UE is not able to perform UL/DL data transmissions. The UE may need to establish/re-establish the RRC/eRRC connection for further UL/DL data transmissions. However, the establishment/re-establishment procedure may cause extra latency. For some scenarios or applications, such extra latency may seriously affect the performance of the UE or the user experiences.

Figure 1:
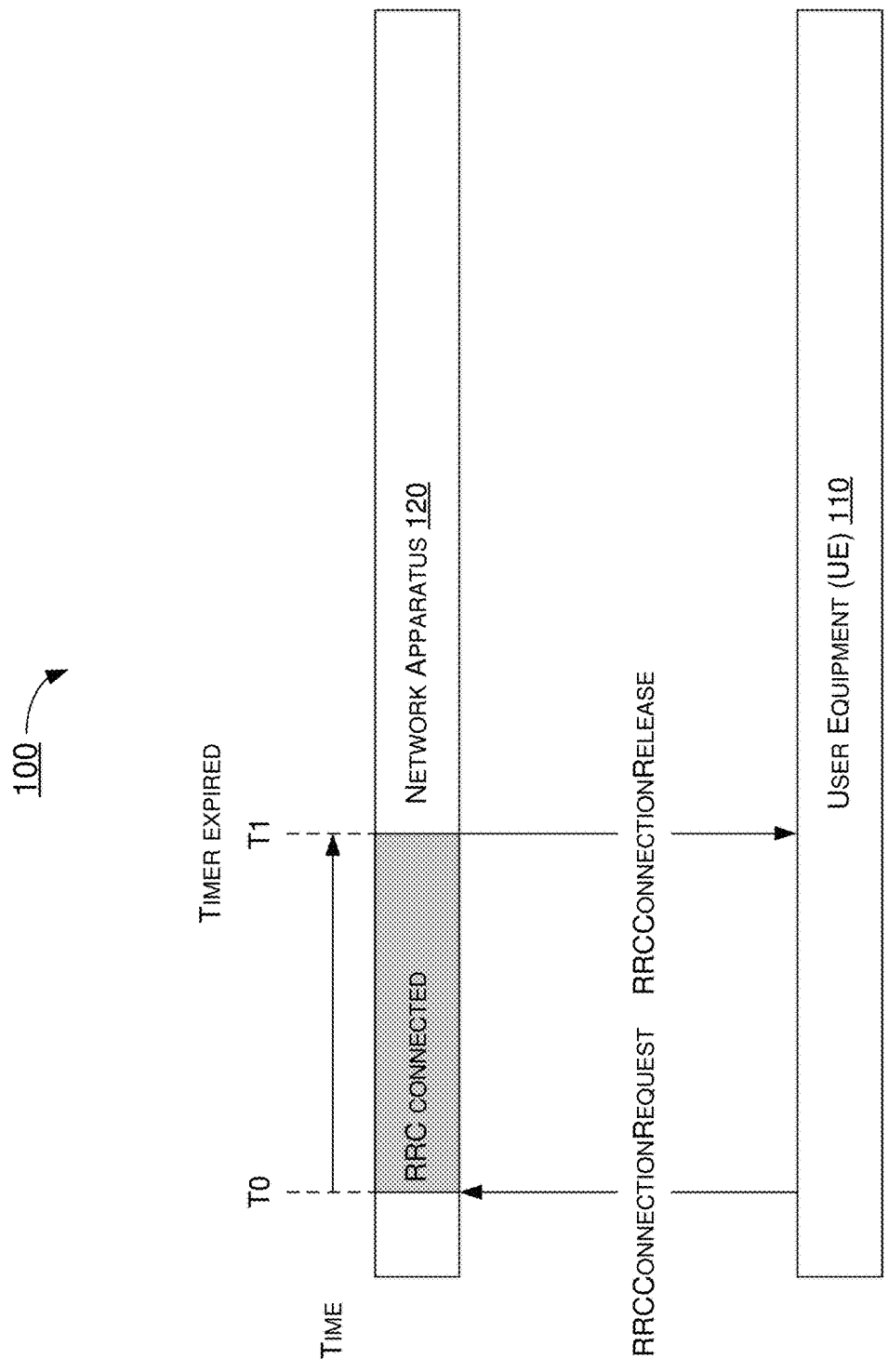
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves UE 110 and network apparatus 120, which may be a part of a wireless communication network (e.g., an LTE network, an LTE-Advanced network, an LTE-Advanced Pro network, a 5G network, an NR network, an IoT network or an NB-IoT network). At time T0, UE 110 may be configured to transmit a request message (e.g., RRCConnectionRequest message) to establish a RRC/eRRC connection. UE 110 may perform the UL/DL data transmission via the established RRC/eRRC connection. Network apparatus 120 may be configured to initiate a timer to count how long there is no UL/DL data transmission. When the timer is expired (e.g., at time T1), network apparatus 120 may be configured to transmit a connection release message (e.g., RRCConnectionRelease message) to release the RRC/eRRC connection. After the RRC/eRRC connection is released, UE 110 may not be able to perform the UL/DL data transmission. When new data comes up, UE 110 may only have to establish the RRC/eRRC connection again.

In view of the above, the present disclosure proposes a number of schemes pertaining to maintaining the RRC/eRRC connection with respect to the UE and the network apparatus. When the RRC/eRRC connection is established, some schemes may be triggered to keep the UE always in the RRC/eRRC connected mode. The UE may be configured to transmit some packets to maintain the RRC/eRRC connection. When new data comes up, the UE may be able to immediately transmit/receive the new data without establishing/re-establishing the RRC/eRRC connection. Accordingly, the connection establishment/re-establishment procedures may be skipped and extra latency may be avoided. For some scenarios or applications, the UE may have better response time or performance by the reduced latency.

Figure 2:
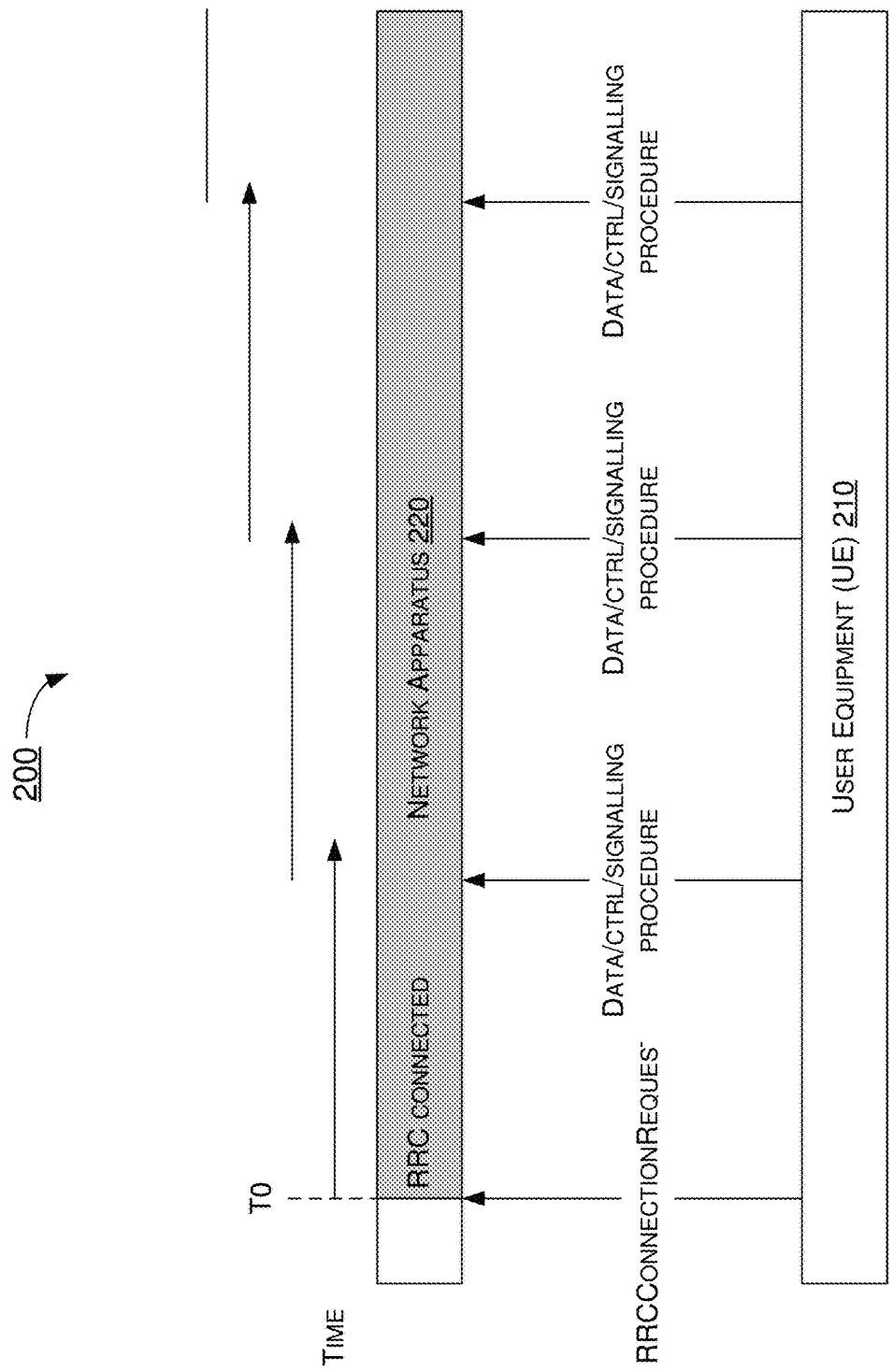
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves UE 210 and network apparatus 220, which may be a part of a wireless communication network (e.g., an LTE network, an LTE-Advanced network, an LTE-Advanced Pro network, a 5G network, an NR network, an IoT network or an NB-IoT network). At time T0, UE 210 may be configured to transmit a request message (e.g., RRCConnectionRequest message) to establish a RRC/eRRC connection. UE 210 may perform the UL/DL data transmission via the established RRC/eRRC connection. Network apparatus 220 may be configured to initiate a timer to count how long there is no UL/DL data transmission. In a case that the timer is expired, network apparatus 220 may transmit a connection release message (e.g., RRCConnectionRelease message) to release the RRC/eRRC connection. Accordingly, before the timer is expired, UE 210 may be configured to transmit a layer 2 packet to maintain the RRC/eRRC connection after a period of time without data transmission. The interval of transmitting the layer 2 packet should be shorter than the length of the timer at network apparatus 220.

Specifically, UE 210 may also initiate a timer at the UE side to count the idle time of the RRC/eRRC connection. The timer value of UE 210 may be configured to be less than the timer value of network apparatus 220. For example, UE 210 may be configured to determine the timer value by learning the timer value of network apparatus 220. UE 210 may establish the RRC/eRRC connection with network apparatus 220 and see how long the RRC/eRRC connection may be released by network apparatus 220. After the RRC/eRRC connection is released, UE 210 may estimate the timer value of network apparatus 220. Then, UE 210 may determine a timer value less than the timer value of network apparatus 220.

When the timer of UE 210 is expired (e.g., before the expiration of the timer at network apparatus 220), UE 210 may be configured to transmit the layer 2 packet to network apparatus 220. UE 210 may also be configured to transmit the layer 2 packet periodically. UE 210 may need to transmit the layer 2 packet before the RRC/eRRC connection release from network apparatus 220. After receiving the layer 2 packet, network apparatus 220 may consider that UE 210 always has data to transmit. Hence, network apparatus 220 may not release the RRC/eRRC connection. In a case that UE 210 expects that there will be UL/DL data transmission within a period of time, UE 210 may enable such mechanism to keep the RRC/eRRC connection in the connected state. Since there is no need for UE 210 to take extra time for establishing/re-establishing the RRC/eRRC connection, the end-to-end delay may be reduced.

In some implementations, the layer 2 packet may comprise a packet data convergence protocol (PDCP)/evolved PDCP (ePDCP) control protocol data unit (PDU), a radio link control (RLC)/evolved RLC (eRLC) control PDU, or a media access control (MAC)/evolved MAC (eMAC) control PDU. The PDCP/ePDCP control PDU may comprise a PDCP status report, an interspersed robust header compression (ROHC) feedback packet, an LTE-Wireless Local Area Network (WLAN) aggregation (LWA) status report, an LWA end-marker packet, or a reserved type packet. The RLC/eRLC control PDU may comprise a status PDU. The MAC/eMAC control PDU may comprise a scheduling request (SR), a buffer status report (BSR), a random access (RA) procedure, or a power headroom report (PHR).

In some implementations, the layer 2 packet may comprise a PDCP/ePDCP retransmission PDU, an RLC/eRLC retransmission PDU, or a MAC/eMAC retransmission PDU. The retransmission PDU may be a duplicated data PDU of each layer (e.g., PDCP layer, RLC layer or MAC layer). The PDCP/ePDCP or RLC/eRLC PDU may be transmitted in the signaling radio bearer (SRB) or data radio bearer (DRB).

The advantage of transmitting the control PDU is that the traffic of the control PDU may not be charged by the service providers (e.g., operators). Instead of transmitting a dummy packet (e.g., a higher-layer packet) to maintain the RRC/eRRC connection, transmitting a layer 2 packet may be more efficient/instant and free from charge. Since the layer 2 packet may not be delivered out of the network apparatus (e.g., base station), it may not increase the data amount needed to be charged.

In some implementations, UE 210 may also be configured to transmit a PDCP/ePDCP service data unit (SDU) to maintain the RRC/eRRC connection. The PDCP/ePDCP SDU may comprise an internet protocol (IP) packet, or an internet control message protocol (ICMP) packet.

In some implementations, UE 210 may be able to adaptively switch the type of the packet (e.g., layer 2 packet or PDCP/ePDCP SDU) to maintain the RRC/eRRC connection. UE 210 may be configured to try one type of the packet firstly. In a case that the transmitted type of packet is not working, UE 210 may be configured to switch to another type of packet for maintaining the RRC/eRRC connection. For example, UE 210 may try to transmit the layer 2 packet to maintain the RRC/eRRC connection firstly. UE 210 may further determine whether the RRC/eRRC connection can be maintained by the layer 2 packet. In a case that the RRC/eRRC connection cannot be maintained by the layer 2 packet, UE 210 may be configured to transmit the PDCP/ePDCP SDU instead of the layer 2 packet to maintain the RRC/eRRC connection. Alternatively, UE 210 may try to transmit the PDCP/ePDCP SDU to maintain the RRC/eRRC connection firstly. UE 210 may further determine whether the RRC/eRRC connection can be maintained by the PDCP/ePDCP SDU. In a case that the RRC/eRRC connection cannot be maintained by the PDCP/ePDCP SDU, UE 210 may be configured to transmit the layer 2 packet instead of the PDCP/ePDCP SDU to maintain the RRC/eRRC connection.

In some implementations, UE 210 may be configured to determine a characteristic of network apparatus 220. UE 210 may determine whether to transmit the layer 2 packet or the PDCP/ePDCP SDU according to the characteristic of the network node. UE 210 may determine the characteristic of network apparatus 220 by a learning mechanism. For example, some network apparatus may accept the layer 2 packet to maintain the RRC/eRRC connection. Some network apparatus may not accept the layer 2 packet to maintain the RRC/eRRC connection. When UE 210 camp on a network apparatus, UE 210 may learn the characteristic of the network apparatus (e.g., whether RRC/eRRC connection can be maintained by layer 2 packet). UE 210 may store the characteristic of each camped network apparatus. Accordingly, when UE 210 camps on the same network apparatus, UE 210 may be able to determine which type of packet can be accepted for maintaining RRC/eRRC connection according to its stored information. UE 210 may transmit the effective type of packet to maintain the RRC/eRRC connection.

In some implementations, UE 210 may be configured to determine whether the RRC/eRRC connection is released. When detecting that the RRC/eRRC connection is released, UE 210 may be configured to establish/re-establish the RRC/eRRC connection immediately. UE 210 may use a legacy signaling or a new layer 3 signaling to trigger the establishment/re-establishment procedures.

The above mentioned schemes for maintaining the RRC/eRRC connection may increase power consumption of the UE. Since the RRC/eRRC connection is always in the connected state, the UE may keep turning on its transceiver and processor without entering into a power saving mode. Thus, the schemes proposed in the present disclosure may be enabled or disabled when some conditions are satisfied. The UE may be further configured to determine whether a certain condition is satisfied. When the certain condition is satisfied, the UE may be configured to enable or disable the schemes in accordance with implementations of the present disclosure for maintaining the RRC/eRRC connection. The certain condition may comprise, for example and without limitations, whether a game is turned on/off, whether the UE screen is turned on/off, whether the UE power is turned on/off, whether the flight mode is turned on/off, whether a power saving mode is turned on/off, etc. For example, when an online game is turned on, the UE may need to instantly receive/transmit game data without latency. The UE may enable the schemes in the present disclosure to keep the RRC/eRRC connection in the connected state. The end-to-end latency may be reduced and the user experiences may be improved.

Illustrative Implementations

Figure 3:
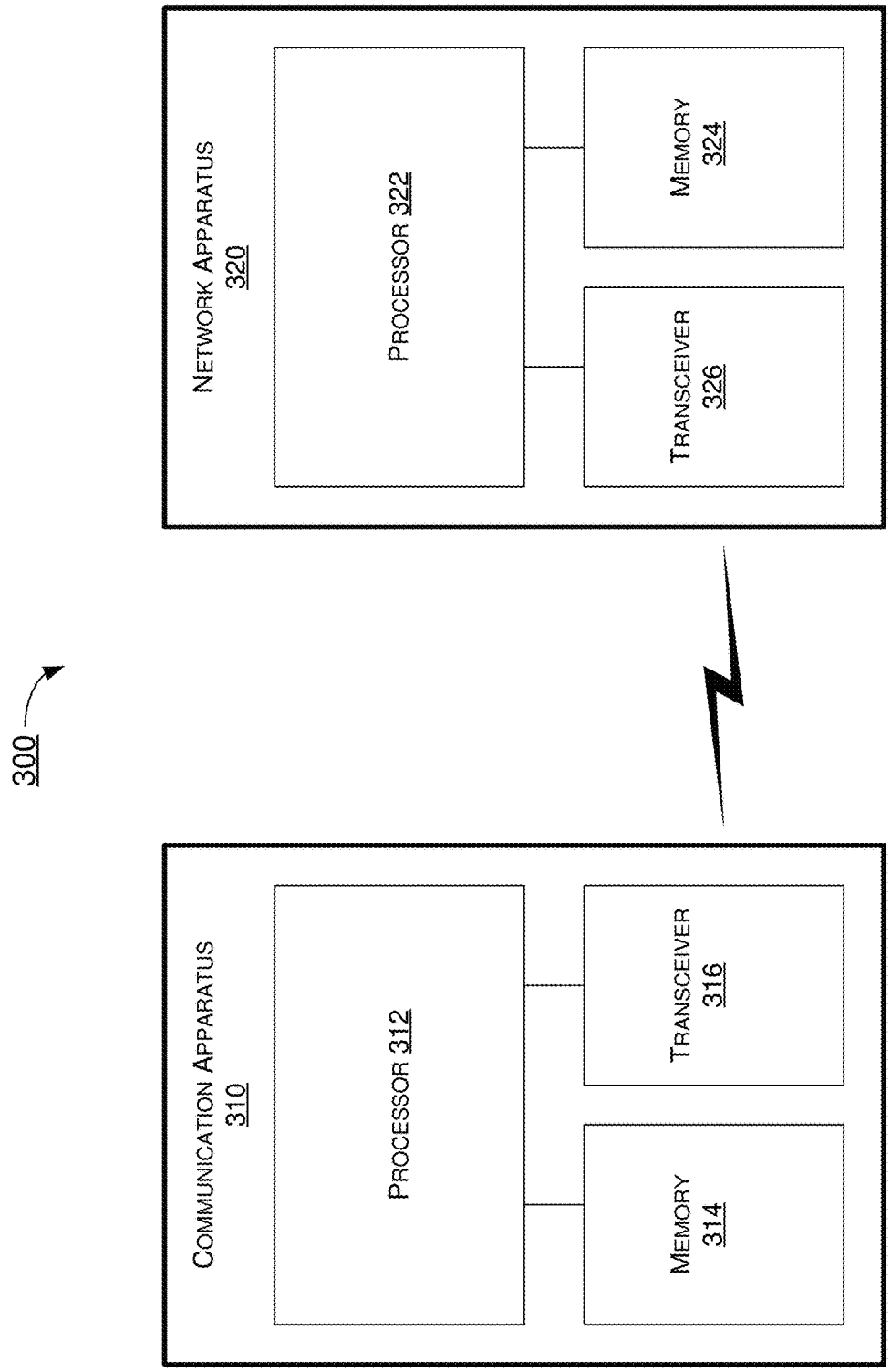
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to maintaining RRC/eRRC connection with respect to user equipment and network apparatus in wireless communications, including scenario 200 described above as well as processes 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in a LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, or one or more CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may be configured to transmit, via transceiver 316, a request message (e.g., RRCConnectionRequest message) to establish a RRC/eRRC connection. Processor 312 may perform the UL/DL data transmission via the established RRC/eRRC connection. Processor 322 may be configured to initiate a timer to count how long there is no UL/DL data transmission. In a case that the timer is expired, processor 322 may transmit a connection release message (e.g., RRCConnectionRelease message) to release the RRC/eRRC connection. Accordingly, before the timer is expired, processor 312 may be configured to transmit a layer 2 packet to maintain the RRC/eRRC connection after a period of time without data transmission. The interval of transmitting the layer 2 packet should be shorter than the length of the timer at network apparatus 320.

In some implementations, processor 312 may also initiate a timer to count the idle time of the RRC/eRRC connection. The timer value initiated by processor 312 may be configured to be less than the timer value initiated by network apparatus 320. For example, processor 312 may be configured to determine the timer value by learning the timer value of network apparatus 320. Processor 312 may establish the RRC/eRRC connection with network apparatus 320 and see how long the RRC/eRRC connection may be released by network apparatus 320. After the RRC/eRRC connection is released, processor 312 may estimate the timer value of network apparatus 320. Then, processor 312 may determine a timer value less than the timer value of network apparatus 320.

In some implementations, when the timer initiated by processor 312 is expired (e.g., before the expiration of the timer at network apparatus 320), processor 312 may be configured to transmit the layer 2 packet to network apparatus 320. Processor 312 may also be configured to transmit the layer 2 packet periodically. Processor 312 may need to transmit the layer 2 packet before the RRC/eRRC connection release from network apparatus 320. After receiving the layer 2 packet, processor 322 may consider that communication apparatus 310 always has data to transmit. Hence, processor 322 may not release the RRC/eRRC connection. In a case that processor 312 expects that there will be UL/DL data transmission within a period of time, processor 312 may enable such mechanism to keep the RRC/eRRC connection in the connected state. Since there is no need for processor 312 to take extra time for establishing/re-establishing the RRC/eRRC connection, the end-to-end delay may be reduced.

In some implementations, the layer 2 packet may comprise a PDCP/ePDCP control PDU, an RLC/eRLC control PDU, or a MAC/eMAC control PDU. The PDCP/ePDCP control PDU may comprise a PDCP status report, an interspersed ROHC feedback packet, an LWA status report, an LWA end-marker packet, or a reserved type packet. The RLC/eRLC control PDU may comprise a status PDU. The MAC/eMAC control PDU may comprise an SR, a BSR, an RA procedure, or a PHR.

In some implementations, the layer 2 packet may comprise a PDCP/ePDCP retransmission PDU, an RLC/eRLC retransmission PDU, or a MAC/eMAC retransmission PDU. The retransmission PDU may be a duplicated data PDU of each layer (e.g., PDCP layer, RLC layer or MAC layer). The PDCP/ePDCP or RLC/eRLC PDU may be transmitted in the SRB or DRB.

In some implementations, processor 312 may also be configured to transmit a PDCP/ePDCP SDU to maintain the RRC/eRRC connection. The PDCP/ePDCP SDU may comprise an IP packet, or an ICMP packet.

In some implementations, processor 312 may be able to adaptively switch the type of the packet (e.g., layer 2 packet or PDCP/ePDCP SDU) to maintain the RRC/eRRC connection. Processor 312 may be configured to try one type of the packet firstly. In a case that the transmitted type of packet is not working, processor 312 may be configured to switch to another type of packet for maintaining the RRC/eRRC connection. For example, processor 312 may try to transmit the layer 2 packet to maintain the RRC/eRRC connection firstly. Processor 312 may further determine whether the RRC/eRRC connection can be maintained by the layer 2 packet. In a case that the RRC/eRRC connection cannot be maintained by the layer 2 packet, processor 312 may be configured to transmit the PDCP/ePDCP SDU instead of the layer 2 packet to maintain the RRC/eRRC connection. Alternatively, processor 312 may try to transmit the PDCP/ePDCP SDU to maintain the RRC/eRRC connection firstly. Processor 312 may further determine whether the RRC/eRRC connection can be maintained by the PDCP/ePDCP SDU. In a case that the RRC/eRRC connection cannot be maintained by the PDCP/ePDCP SDU, processor 312 may be configured to transmit the layer 2 packet instead of the PDCP/ePDCP SDU to maintain the RRC/eRRC connection.

In some implementations, processor 312 may be configured to determine a characteristic of network apparatus 320. Processor 312 may determine whether to transmit the layer 2 packet or the PDCP/ePDCP SDU according to the characteristic of network apparatus 320. Processor 312 may determine the characteristic of network apparatus 320 by a learning mechanism. For example, some network apparatus may accept the layer 2 packet to maintain the RRC/eRRC connection. Some network apparatus may not accept the layer 2 packet to maintain the RRC/eRRC connection. When communication apparatus 310 camp on a network apparatus, processor 312 may learn the characteristic of the network apparatus (e.g., whether RRC/eRRC connection can be maintained by layer 2 packet). Processor 312 may store the characteristic of each camped network apparatus in memory 314. Accordingly, when communication apparatus 310 camps on the same network apparatus, processor 312 may be able to determine which type of packet can be accepted for maintaining RRC/eRRC connection according to its stored information in memory 314. Processor 312 may transmit the effective type of packet to maintain the RRC/eRRC connection.

In some implementations, processor 312 may be configured to determine whether the RRC/eRRC connection is released. When detecting that the RRC/eRRC connection is released, processor 312 may be configured to establish/re-establish the RRC/eRRC connection immediately. Processor 312 may use a legacy signaling or a new layer 3 signaling to trigger the establishment/re-establishment procedures.

In some implementations, maintaining the RRC/eRRC connection may increase power consumption of communication apparatus 310. Since the RRC/eRRC connection is always in the connected state, communication apparatus 310 may keep turning on transceiver 316 and processor 312 without entering into a power saving mode. Thus, the schemes proposed in the present disclosure may be enabled or disabled when some conditions are satisfied. Processor 312 may be further configured to determine whether a certain condition is satisfied. When the certain condition is satisfied, processor 312 may be configured to enable or disable the schemes in accordance with implementations of the present disclosure for maintaining the RRC/eRRC connection. The certain condition may comprise, for example and without limitations, whether a game is turned on/off, whether the screen is turned on/off, whether the power is turned on/off, whether the flight mode is turned on/off, whether a power saving mode is turned on/off, etc. For example, when an online game is turned on, communication apparatus 310 may need to instantly receive/transmit game data without latency. Processor 312 may enable the schemes in the present disclosure to keep the RRC/eRRC connection in the connected state. The end-to-end latency may be reduced and the user experiences may be improved.

Illustrative Processes

Figure 4:
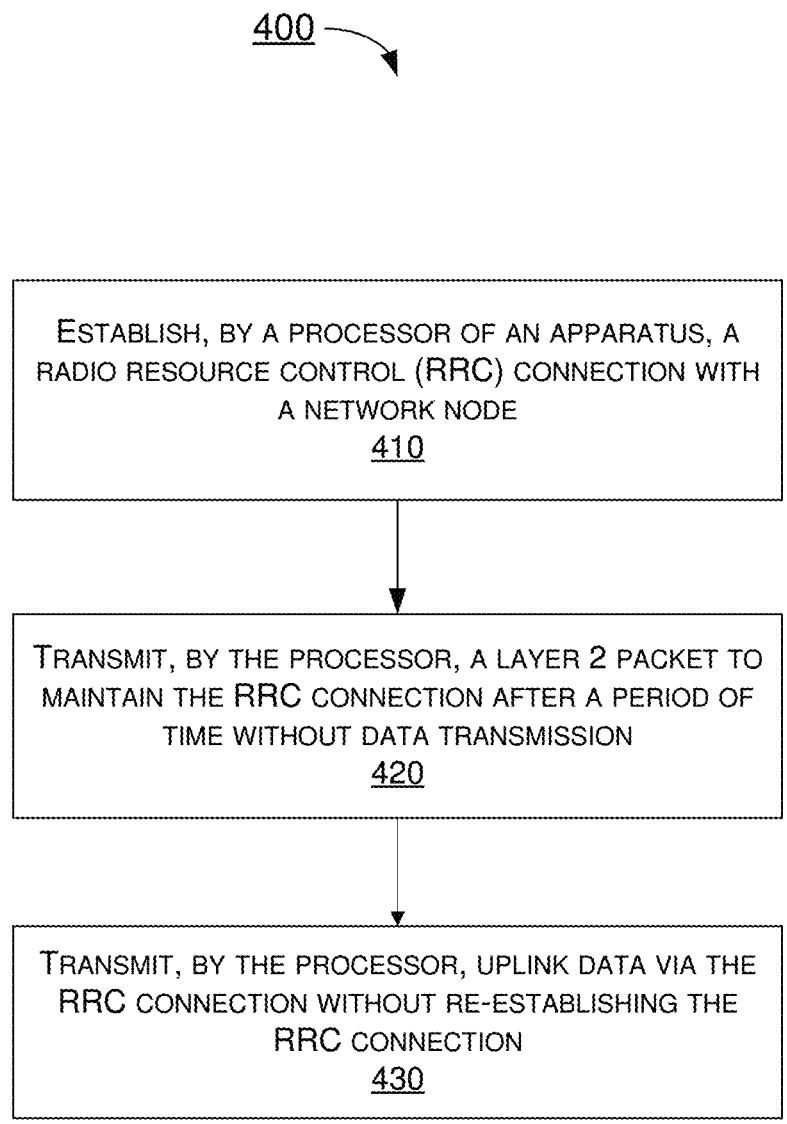
FIG. 4 is a flowchart of an example process in accordance with an implementation of the present disclosure.

FIG. 4 illustrates an example process 400 in accordance with an implementation of the present disclosure. Process 400 may be an example implementation of scenario 200, whether partially or completely, with respect to maintaining RRC connection in accordance with the present disclosure. Process 400 may represent an aspect of implementation of features of communication apparatus 310. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of communication apparatus 310 establishing an RRC connection with a network node. Process 400 may proceed from 410 to 420.

At 420, process 400 may involve processor 312 transmitting a layer 2 packet to maintain the RRC connection after a period of time without data transmission. Process 400 may proceed from 420 to 430.

At 430, process 400 may involve processor 312 transmitting uplink data via the RRC connection without re-establishing the RRC connection.

In some implementations, the layer 2 packet may comprise a PDCP control PDU, an RLC control PDU, or a MAC control PDU.

In some implementations, the PDCP control PDU may comprise a PDCP status report, an interspersed ROHC feedback packet, an LWA status report, an LWA end-marker packet, or a reserved type packet.

In some implementations, the RLC control PDU may comprise a status PDU.

In some implementations, the MAC control PDU may comprise an SR, a BSR, an RA procedure, or a PHR.

In some implementations, the layer 2 packet may comprise a PDCP retransmission PDU, an RLC retransmission PDU, or a MAC retransmission PDU.

In some implementations, process 400 may involve processor 312 determining that the RRC connection cannot be maintained by the layer 2 packet. Process 400 may further involve processor 312 transmitting a PDCP SDU to maintain the RRC connection.

In some implementations, the PDCP SDU may comprise an IP packet, or an ICMP packet.

In some implementations, process 400 may involve processor 312 determining a characteristic of the network node. Process 400 may further involve processor 312 determining whether to transmit the layer 2 packet according to the characteristic of the network node.

In some implementations, process 400 may involve processor 312 detecting whether the RRC connection is released. Process 400 may further involve processor 312 re-establishing the RRC connection immediately when the RRC connection is released.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

establishing, by a processor of an apparatus, a radio resource control (RRC) connection with a network node of a wireless network;

performing, by the processor, either a first procedure or a second procedure to maintain the RRC connection; and transmitting, by the processor, to the network node uplink data via the RRC connection without re-establishing the RRC connection, wherein the first procedure comprises:

transmitting, by the processor, to the network node a packet data convergence protocol (PDCP) status report, an interspersed robust header compression (ROHC) feedback packet, a Long-Term Evolution (LTE)-Wireless Local Area Network (WLAN) aggregation (LWA) status report, an LWA end-marker packet, a reserved type packet, a status protocol data unit (PDU), a scheduling request (SR), a buffer status report (BSR), a random access (RA) procedure, or a power headroom report (PHR);

determining, by the processor, that the RRC connection cannot be maintained by the PDCP status report, the interspersed ROHC feedback packet, the LWA status report, the LWA end-marker packet, the reserved type packet, the status PDU, the SR, the BSR, the RA procedure, or the PHR; and transmitting, by the processor, a PDCP service data unit (SDU) to maintain the RRC connection, and wherein the second procedure comprises:

transmitting, by the processor, to the network node the PDCP status report, the interspersed ROHC feedback packet, the LWA status report, the LWA end-marker packet, the reserved type packet, the status PDU, the SR, the BSR, the RA procedure, or the PHR to maintain the RRC connection responsive to a characteristic of the network node being determined, wherein the characteristic of the network node comprises the PDCP status report, the interspersed ROHC feedback packet, the LWA status report, the LWA end-marker packet, the reserved type packet, the status PDU, the SR, the BSR, the RA procedure, or the PHR being acceptable to the network node to maintain the RRC connection.

2. A method comprising:

establishing, by a processor of an apparatus, a radio resource control (RRC) connection with a network node of a wireless network;

transmitting, by the processor, to the network node a packet data convergence protocol (PDCP) status report, an interspersed robust header compression (ROHC) feedback packet, a Long-Term Evolution (LTE)-Wireless Local Area Network (WLAN) aggregation (LWA) status report, an LWA end-marker packet, a reserved type packet, a status protocol data unit (PDU), a scheduling request (SR), a buffer status report (BSR), a random access (RA) procedure, or a power headroom report (PHR);

determining, by the processor, that the RRC connection cannot be maintained by the PDCP status report, the interspersed ROHC feedback packet, the LWA status report, the LWA end-marker packet, the reserved type packet, the status PDU, the SR, the BSR, the RA procedure, or the PHR;

transmitting, by the processor, a PDCP service data unit (SDU) to maintain the RRC connection; and transmitting, by the processor, to the network node uplink data via the RRC connection without re-establishing the RRC connection.

3. The method of claim 2, wherein the PDCP SDU comprises an internet protocol (IP) packet, or an internet control message protocol (ICMP) packet.

4. The A method comprising:

establishing, by a processor of an apparatus, a radio resource control (RRC) connection with a network node of a wireless network;

transmitting, by the processor, to the network node a packet data convergence protocol (PDCP) status report, an interspersed robust header compression (ROHC) feedback packet, a Long-Term Evolution (LTE)-Wireless Local Area Network (WLAN) aggregation (LWA) status report, an LWA end-marker packet, a reserved type packet, a status protocol data unit (PDU), a scheduling request (SR), a buffer status report (BSR), a random access (RA) procedure, or a power headroom report (PHR) to maintain the RRC connection responsive to a characteristic of the network node being determined, wherein the characteristic of the network node comprises the PDCP status report, the interspersed ROHC feedback packet, the LWA status report, the LWA end-marker packet, the reserved type packet, the status PDU, the SR, the BSR, the RA procedure, or the PHR being acceptable to the network node to maintain the RRC connection; and transmitting, by the processor, to the network node uplink data via the RRC connection without re-establishing the RRC connection.

5. The method of claim 1, further comprising:

detecting, by the processor, whether the RRC connection is released; and re-establishing, by the processor, the RRC connection when the RRC connection is released.

* * * * *